United States Patent
Lindic et al.

(10) Patent No.: US 11,104,298 B2
(45) Date of Patent: Aug. 31, 2021

(54) ASSEMBLY MODULE FOR A MOTOR VEHICLE COMPRISING AN OPTICAL SENSOR SYSTEM AND AN EMERGENCY ACTUATION MEANS

(71) Applicant: Huf Hülsbeck & Fürst GmbH & Co. KG, Velbert (DE)

(72) Inventors: Iko Lindic, Essen (DE); Helmut Schumacher, Coesfeld (DE); Norbert Heller, Grefrath (DE); Oliver Müller, Velbert (DE); Bernd Ette, Wolfsburg (DE); Nadine Sticherling, Essen (DE); Alexander Ziegler, Wülfrath (DE); Jean Malabo Yomkil, Essen (DE); Stefan Mönig, Schwelm (DE); Mirko Schindler, Velbert (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/115,592

(22) PCT Filed: Jan. 7, 2015

(86) PCT No.: PCT/DE2015/100007
§ 371 (c)(1),
(2) Date: Jul. 29, 2016

(87) PCT Pub. No.: WO2015/113553
PCT Pub. Date: Aug. 6, 2015

(65) Prior Publication Data
US 2017/0166166 A1 Jun. 15, 2017

(30) Foreign Application Priority Data

Jan. 31, 2014 (DE) ..................... 10 2014 101 199.6

(51) Int. Cl.
*B60R 25/24* (2013.01)
*G07C 9/00* (2020.01)
(Continued)

(52) U.S. Cl.
CPC .............. *B60R 25/24* (2013.01); *B60R 25/01* (2013.01); *B60R 25/30* (2013.01); *B60R 25/403* (2013.01);
(Continued)

(58) Field of Classification Search
None
See application file for complete search history.

(56) References Cited

U.S. PATENT DOCUMENTS 6,359,348 B1 * 3/2002 King .................... B60R 25/24
307/10.1
8,059,150 B2 * 11/2011 Gal .................. G08B 13/19628
348/37

(Continued)

FOREIGN PATENT DOCUMENTS

CN 101519935 A 9/2009
CN 103527030 A 1/2014

(Continued)

OTHER PUBLICATIONS

Notification of the First Office Action for related Chinese application No. 201580006661.8 dated Mar. 16, 2018, with an English translation, 16 pages.

(Continued)

*Primary Examiner* — Behrang Badii
*Assistant Examiner* — Daniel L Greene
(74) *Attorney, Agent, or Firm* — Rudy J. Ng; Bret E. Field; Bozicevic, Field & Francis LLP

(57) ABSTRACT

The invention relates to an assembly module (20) for a motor vehicle (1), comprising an optical sensor system (30)
(Continued)

Figure 1:
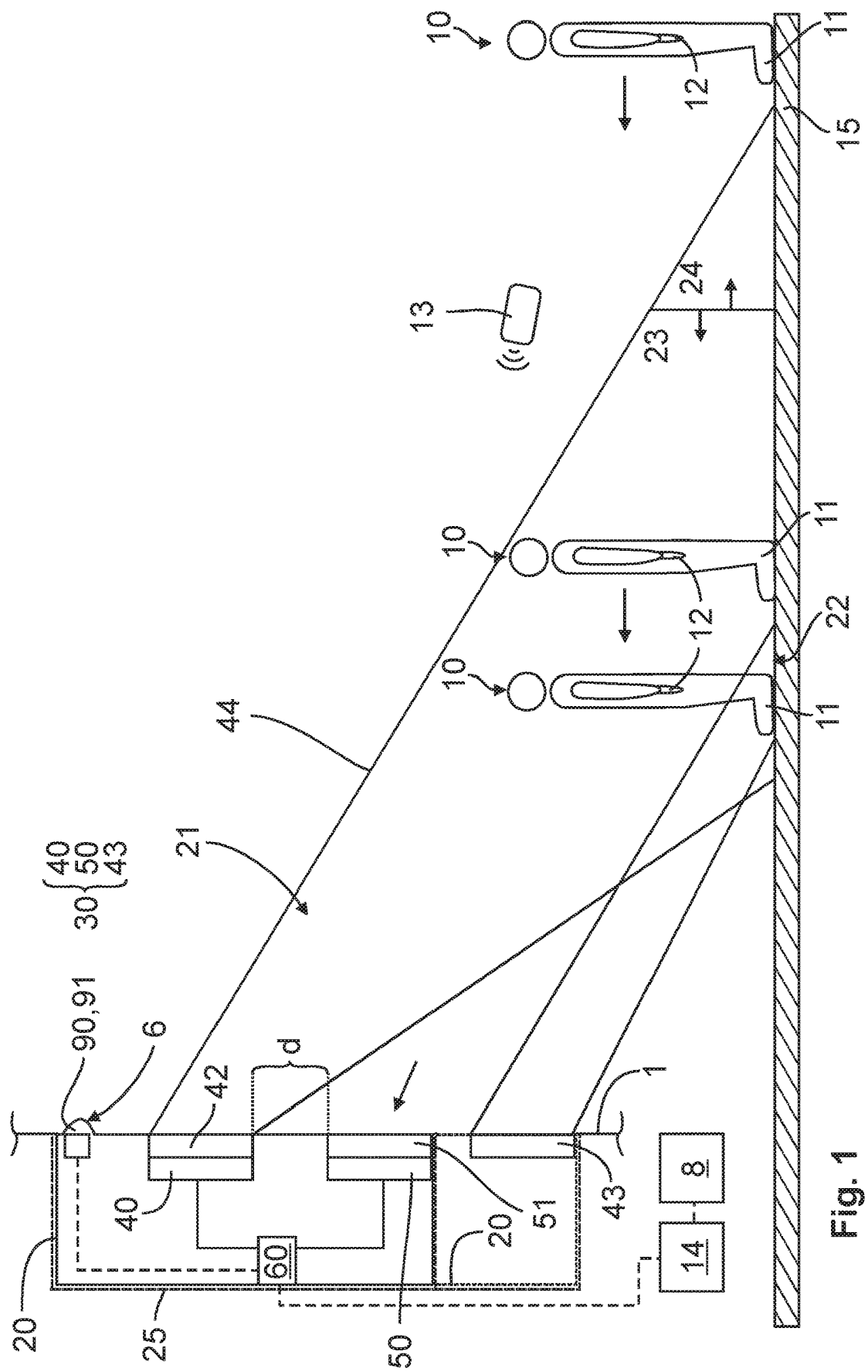

which is suitable a) for monitoring a detection area (21) located outside of the vehicle (1), b) if a user (10) is detected in the detection area (21), for triggering a signal to commence an authentication check between an ID transponder (13) and the motor vehicle (1), c) for monitoring an actuation area (22) which is located outside of the vehicle (1) and which is different from the detection area (21), d) if a user (10) is detected in the actuation area (22), for providing a working signal for the vehicle (1), wherein an emergency actuation means (90) is provided for additionally triggering the working signal, which emergency actuation means is suitable e) for providing a working signal for the vehicle (1) via an activation of the emergency actuation means (90) by a body part (11, 12) of the user (10).

35 Claims, 8 Drawing Sheets

(51) Int. Cl.
  *E05F 15/73* (2015.01)
  *B60R 25/01* (2013.01)
  *B60R 25/30* (2013.01)
  *B60R 25/40* (2013.01)
(52) U.S. Cl.
  CPC .......... *E05F 15/73* (2015.01); *G07C 9/00309* (2013.01); *E05F 2015/765* (2015.01); *E05Y 2900/531* (2013.01); *E05Y 2900/546* (2013.01); *G07C 2009/00769* (2013.01); *G07C 2209/64* (2013.01)

(56) References Cited

U.S. PATENT DOCUMENTS

| | | | | |
|---|---|---|---|---|
| 2010/0235026 | A1* | 9/2010 | Shimizu | B60R 25/241 701/22 |
| 2012/0123649 | A1* | 5/2012 | Eggers | E05F 15/76 701/49 |
| 2012/0158253 | A1* | 6/2012 | Kroemke | B60R 25/2054 701/49 |
| 2013/0200995 | A1 | 8/2013 | Muramatsu et al. | |
| 2015/0213707 | A1* | 7/2015 | Christensen | G06Q 10/06395 340/573.1 |
| 2015/0358790 | A1* | 12/2015 | Nasserbakht | G06F 16/128 455/414.1 |

FOREIGN PATENT DOCUMENTS

| | | |
|---|---|---|
| DE | 102005032402 B3 | 9/2006 |
| DE | 102008021989 A1 | 12/2008 |
| DE | 102007050094 A1 | 4/2009 |
| DE | 102009023594 A1 | 12/2010 |
| DE | 102010060364 A1 | 5/2012 |
| DE | 102010056171 A1 | 6/2012 |
| DE | 102011115760 A1 | 4/2013 |
| JP | 2014530309 A | 11/2014 |
| WO | WO-2007006514 A1 * | 1/2007 .......... B60Q 1/0023 |
| WO | WO2013037806 A1 | 3/2013 |

OTHER PUBLICATIONS

Notice of Reasons for Rejection for Japanese Application No. 2016-567131 dated Dec. 4, 2018, with its English translation, 9 pages.
Notification of the Third Office Action for Chinese Patent Application No. 201580006661.8, dated Aug. 19, 2019, and its English translation, 11 pages.
Notice of Reasons for Rejection for Japanese Patent Application No. 2016-567131, dated Aug. 27, 2019, and its English translation, 3 pages.
Extended European Search Report for European Application No. 19219398.5 dated Jul. 27, 2020, with its English translation, 8 pages.

* cited by examiner

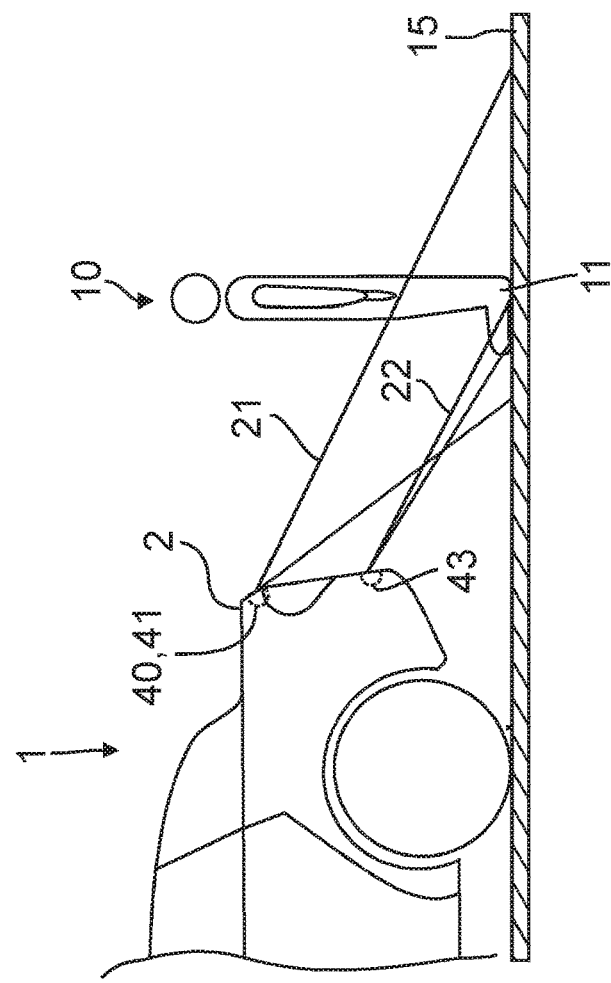
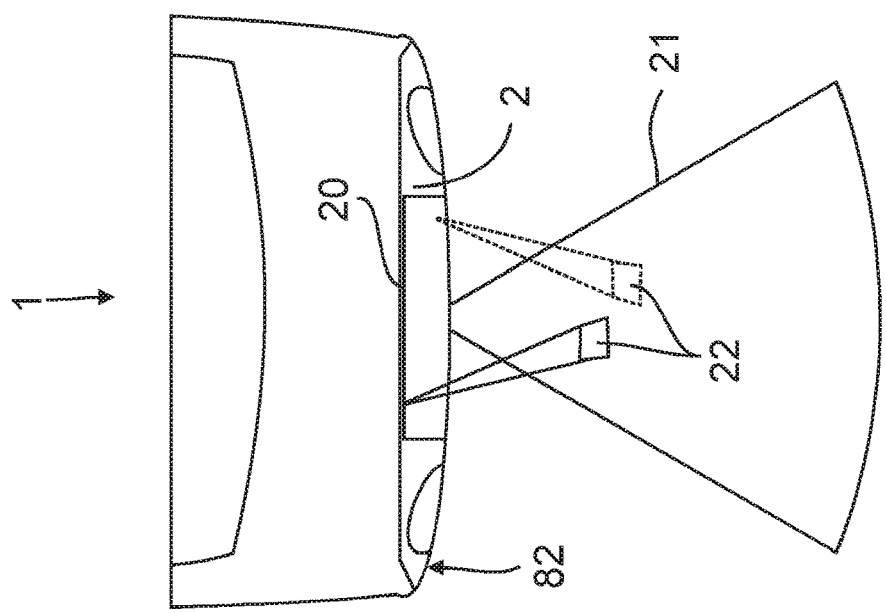

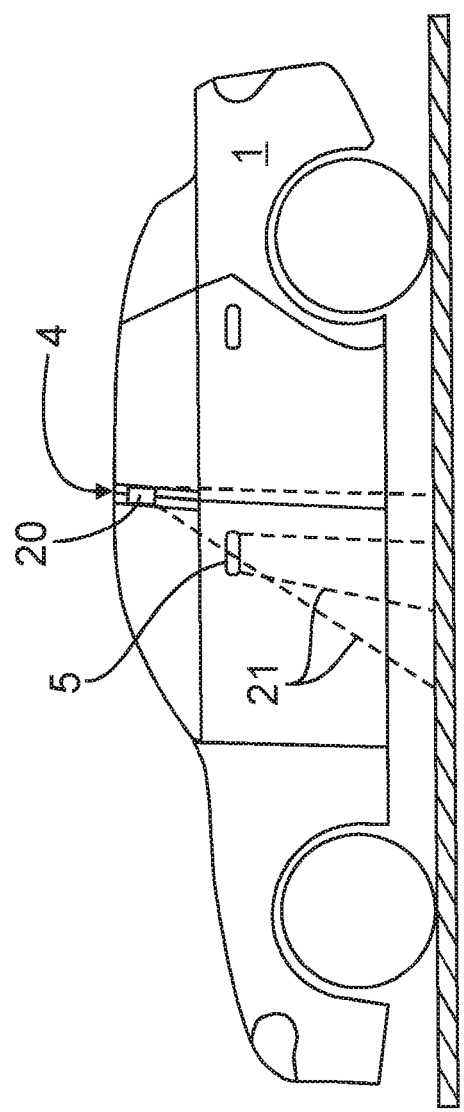
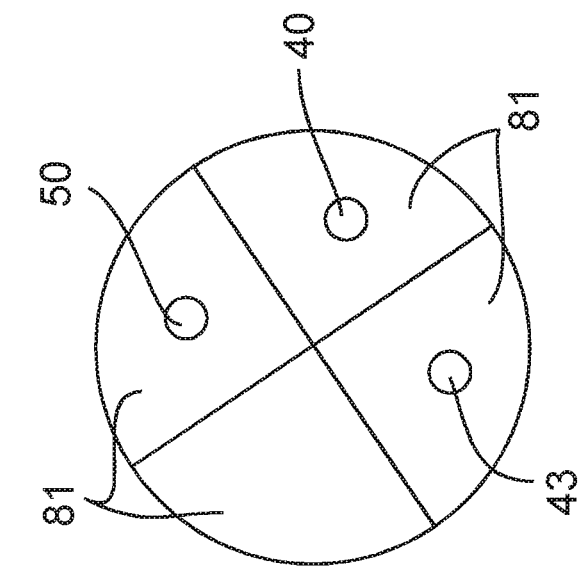
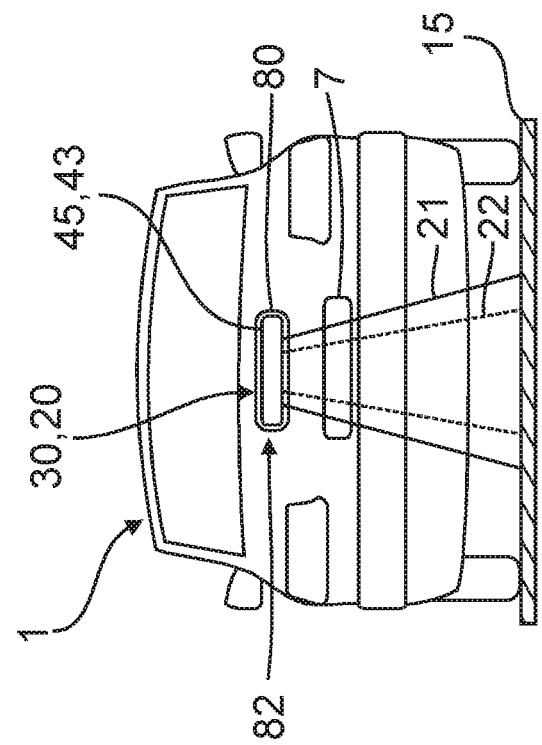
Fig. 7
Fig. 9
Fig. 8

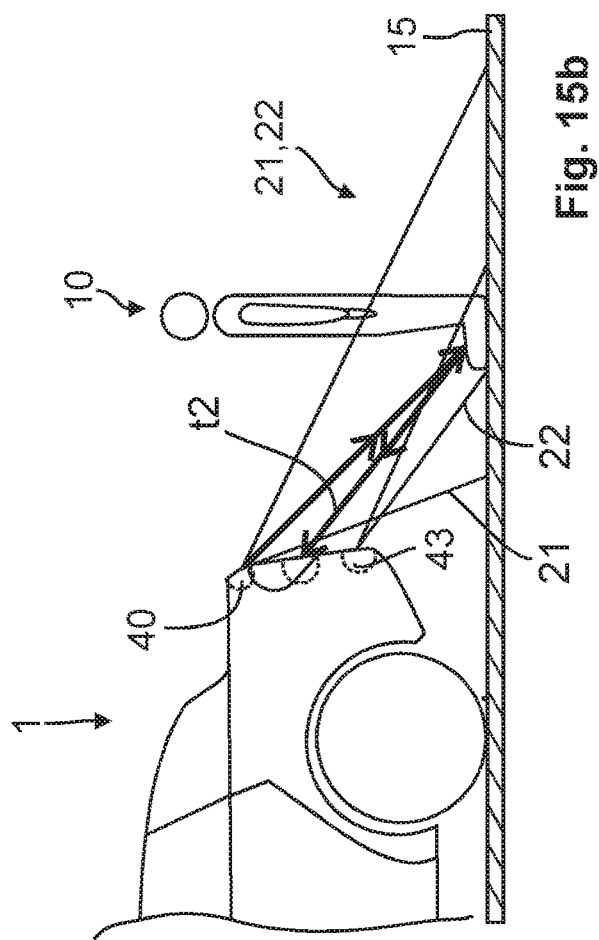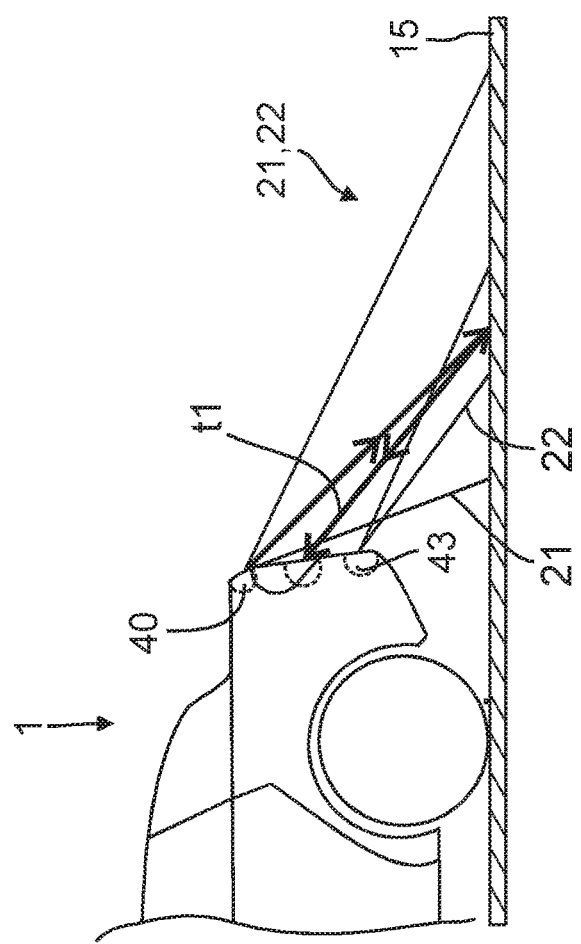

ASSEMBLY MODULE FOR A MOTOR VEHICLE COMPRISING AN OPTICAL SENSOR SYSTEM AND AN EMERGENCY ACTUATION MEANS

The invention pertains to an assembly module for a motor vehicle which is suitable for making available an operating signal for the motor vehicle in case a user is detected in the proximity of the motor vehicle. The invention furthermore pertains to a method for triggering an operating signal for a motor vehicle as described herein.

DE 10 2008 021 989 A1 discloses a light source for generating a control panel that is visible to the user. The control panel is defined on a small section of a ground area, the size of which approximately corresponds to two shoe prints. The control panel is generated when the approach of a person is detected by a sensor that is not described in greater detail. The user can deliberately touch the control panel with a foot and thereby start an authentication check for access authorization.

In this case, it is disadvantageous that the approach of a person initially has to be detected with another sensor before the authentication check is started. In addition, the user already has to be located near the motor vehicle and deliberately step into a visible control panel in order to start the authentication check. The user therefore has to become active in order to start the authentication check. This is time-consuming for the user.

It is furthermore conceivable that such access authorization systems can malfunction, particularly in extreme situations, such that access to the motor vehicle is denied to the user.

The present invention therefore is based on the objective of developing an assembly module for a motor vehicle and a method for triggering at least one signal for a motor vehicle, by means of which at least one of the aforementioned disadvantages is eliminated and, in particular, an authentication check can be started unnoticeably and/or early for the user and/or specifically for an approaching user, wherein the functionality is expanded if potential radio interferences occur in the optical sensor system.

In order to attain this objective, the invention proposes an assembly module as described herein. Advantageous enhancements of the assembly module are disclosed herein. Said objective is also attained with a method as described herein. Advantageous enhancements are disclosed herein.

The invention proposes an assembly module for a motor vehicle with an optical sensor system that is suitable for
a) monitoring a detection area located outside the vehicle,
b) triggering a signal for starting an authentication check between an ID transmitter and the motor vehicle if a user is detected in the detection area,
c) monitoring an actuation area that is located outside the vehicle and differs from the detection area,
d) making available an operating signal for the vehicle in case a user is detected in the actuation area,
wherein an emergency actuation is provided for additionally triggering the operating signal and suitable for
e) making available a operating signal for the vehicle upon activation of the emergency actuation with a body part of the user.

It is particularly advantageous that redundancy is established in case the functionality of the optical sensor system is compromised. This may be the case, for example, if the outside of the sensor system is dirty and the detection area and/or the actuation area therefore cannot be adequately monitored. The user can trigger the operating signal by actively and deliberately activating the emergency actuation, for example, in order to carry out a locking process, unlocking process, opening process or closing process of a movable part of the motor vehicle, particularly the tailgate, the trunk lid or the side door. It is furthermore advantageous that only an optical sensor system is integrated into the assembly module, wherein this optical sensor system one the one hand monitors the detection area and on the other hand monitors the actuation area, which differs from the detection area, and particularly can detect to which extent a user is located in the detection area and/or in the actuation area. Since only one optical sensor system is used for checking the two areas located outside the vehicle, the number of components of the assembly module can be significantly reduced. The optical sensor system ensures that the authentication check between the ID transmitter and the motor vehicle does not start until the user is located in the detection area, wherein the optical sensor system then monitors the actuation area in case of a positive authentication, i.e. if the authorized user is located in the detection area. In order to finally trigger the operating signal for the vehicle, the user has to proceed into the actuation area, which is detected by the optical sensor system.

The assembly module advantageously features an emergency actuation with an activating means, particularly a push-button or a switch. The user is able to activate the emergency actuation in order to make available the operating signal for the vehicle by actuating the activating means, which is accessible to the user. It would be conceivable, for example, to realize the activating means in a capacitive or inductive or contactless fashion or with a piezo-element.

According to an enhancement of the invention, the sensor system may be suitable for monitoring and/or operating and/or generating the detection area and/or the actuation area with increased power, particularly if the sensor system is dirty. The sensor system can reliably monitor the detection area and/or the actuation area by means of the increased power, with which it is operated. A dirty sensor system can be automatically detected. For example, the optical sensor system may feature a control device that is responsible for monitoring the detection area and/or for detecting the user in the detection area and triggering the authentication check and/or for monitoring the actuation area and/or for triggering the operating signal for the motor vehicle. It would likewise be conceivable that the assembly module features individual control unit modules that are respectively responsible for monitoring the detection area, for triggering the authentication check, for monitoring the actuation area and for making available the operating signal independently of one another. These individual control unit modules are advantageously integrated into the optical sensor system. It may furthermore be essential to the invention that the detection of a user can be restricted to the specified detection area, which is located outside the motor vehicle and can be defined in the form of a space section, due to the use of the optical sensor system. The larger shapes of the detection area result from the design of the optical sensor system, wherein the detection area can be defined in such a way that the user is detected in the detection area before triggering of an operating signal is initiated. The user therefore can be detected earlier than with a capacitive sensor of the type used in the prior art. The detection area can furthermore be restricted to a specific space section, which would not be possible, e.g., if a user is detected by means of a high-frequency signal of the type likewise used in the prior art. In this way, only users located near the optical sensor system can be detected. Consequently, a user can be detected early, as well as specifically, in the detection area defined by the optical sensor system. The control device may be realized in such a way that it independently detects that the sensor system is dirty and/or an inoperable state of the sensor system. It is conceivable that the emergency actuation can always be activated by the user. According to the inventive assembly module, the emergency actuation may only be switched "active" if the optical sensor system is inoperable, wherein the control device particularly can ensure that the emergency actuation can be activated.

The optical sensor system may advantageously feature a sensor and a light module, by means of which light can be emitted in order to generate the detection area, wherein the sensor is designed for receiving light from the detection area and/or the actuation area, and wherein the detection area particularly is invisible to the user.

It is likewise conceivable to realize the assembly module with a light module that features a plurality of light sources. The light module advantageously emits IR radiation. The light serves for generating the detection area. The detection area may be invisible to the user. The light sources and/or the light module may be arranged around the optical sensor. For example, light sources may be arranged to the left and to the right of the optical sensor. Alternatively, the light sources may also be arranged around the circumference of the optical sensor. The light may also consist of laser light.

The inventive assembly module may be advantageously provided with a display element in order to generate the actuation area, wherein the actuation area particularly is visible to the user. The actuation area is advantageously not generated until a positive authentication check has been carried out. The user can carry out a corresponding action and/or movement within the actuation area in order to trigger the operating signal. The sensor system monitors the actuation area and can decide to which extent the user has carried out the "correct" action for triggering the operating signal within the actuation area based on defined criteria. The display element may be designed, e.g., for generating the visible actuation area on the ground area, on which the motor vehicle is also parked. The actuation area may likewise lie at the corresponding height of the motor vehicle, i.e. it may be spaced apart from the ground area. For example, it is conceivable that the actuation area approximately lies at the height of the optical sensor system.

It is furthermore conceivable to arrange the assembly module in a receptacle that is designed for installing the assembly module on the motor vehicle, wherein the assembly module or the receptacle is preferably suitable for being mounted on the tail of the motor vehicle or on a side of the motor vehicle, particularly such that the assembly module can be integrated into a handle strip of the motor vehicle or that the receptacle is arranged on an emblem of the motor vehicle. The handle strip may be arranged, e.g., on the tailgate of the motor vehicle. Alternatively, the handle strip may be arranged in the region of the door handle. The actuation area may therefore lie in the region of the door handle. However, the actuation area may alternatively also be simply arranged at a predefined distance or distance range from the display element which is known to the user. It is likewise conceivable that several actuation areas are provided and the user has to express the user intention in each actuation area in order to detect the user intention and to make available the operating signal. If the user is detected in the actuation area, the user intention is preferably detected based on a predefined movement. This predefined movement may consist of the movement of a body part of the user in or on the actuation area. The predefined movement may additionally or alternatively consist of the movement of a body part of the user into the actuation area and/or out of the actuation area. The body part may consist of a foot or a hand of the user. The predefined movement may also be defined more specifically and correspond, for example, to a certain gesture.

According to the invention, the sensor system may likewise be designed in such a way that the detection area is divided into at least two zones, namely into a near zone and a far zone, wherein the near zone is spaced apart from the sensor system by a shorter distance than the far zone, and wherein the detection of the user in accordance with step b) as described herein is not carried out until the user is located in the near zone. The sensor system may be configured in such a way that the detection area is continuously and permanently monitored, wherein the user preferably is already detected by the sensor system in the far zone, but an authentication check requiring additional energy from the motor vehicle is not yet started. A signal for starting the authentication check is not triggered until the user is located in the near zone, which is detected by the sensor system. The boundary between the near zone and the far zone may be arranged, for example, at a distance Z from the optical sensor system. For example, the distance Z amounts to approximately $Z=0.6$ m.

According to the invention, the light module and/or the sensor may be provided with a lens system, wherein the lens system particularly features a filter. The lens system, particularly the sensor, may feature an infrared filter and/or a filter for filtering out extraneous light. The extraneous light may consist, for example, of sunlight or of the light of an artificial light source such as, e.g., garage light. The light module may likewise feature a polarization filter.

The optical sensor system may be realized with a control unit for evaluating the optical sensor. The control unit may be designed for evaluating images that were recorded by the optical sensor. These images may consist of images of the detection area and/or the actuation area.

The inventive optical sensor system may be designed for recording and, if applicable, evaluating detection images and reference images. Detection images are produced with the aid of the reflection of the light emitted by the light module. Reference images are produced with the aid of the extraneous light only. The light module does not emit any light in order to produce the reference images. The control unit can detect the extraneous light based on a comparison of the detection image with a reference image. In this way, the control unit can generate a modified detection image, in which the extraneous light is filtered out. The optical sensor system may be designed in such a way that a reference image is respectively recorded after a predefined number of detection images. Due to the aforementioned measures, the optical sensor system is able to generate an image that is produced with the light of the light module only. The control unit can immediately detect the user. For this purpose, the control unit evaluates the images received from the optical sensor in accordance with predefined criteria. The control unit can ultimately trigger the signal for starting the authentication check.

According to the invention, the optical system may check a defined requirement for the detection of the user in the far zone. For example, the optical system may check the size of the object in the far zone. This requirement particularly may differ from the requirement checked in the near zone. It is preferred to choose the requirement in the far zone such that its check requires less electrical power than the check of the requirement in the near zone. A measurement of the distance of the object from the optical sensor may be carried out in the near zone only. This separation likewise makes it possible to save electrical power.

The optical sensor may furthermore be realized in the form of an LDPD sensor (Lateral Drift Field Photodetector). A CMOS sensor may likewise be used within the optical sensor system. The aforementioned optical sensors respectively record images of the detection area and the actuation area. Each image particularly may be composed of a total number of pixels. The optical sensor may feature an image sensor with the total number of pixels. An LDPD is particularly suitable for being quickly evaluated and at the same time consumes little energy for its operation.

It is furthermore advantageous to design the optical sensor system in such a way that the detection area is at least partially located above a ground area, on which the motor vehicle is parked, wherein the sensor system particularly features a fixed lens system. It is conceivable that the optical sensor system is designed for permanently monitoring the detection area while the motor vehicle is parked until a successful authentication has taken place. In this context, permanently may mean that the optical sensor system is designed for respectively recording and/or evaluating an image after a predefined time interval t. The time interval t particularly may amount to 1 ms≤t≤3 s, preferably 0.05 s≤t≤0.05 s. The optical sensor system can permanently monitor the detection area from the time the vehicle is parked until a successful authentication has taken place. For example, the permanent monitoring may start when the ignition key is removed and/or when the user exits and locks the vehicle.

In order to permanently monitor the detection area, sufficient electric power must be made available for the optical sensor system and/or the authentication system over a prolonged period of time. For example, a battery of the motor vehicle may provide the optical sensor system and/or the authentication system with electric power. In order to ensure that the motor vehicle is also operational after it has been parked for several weeks, the optical sensor system can only consume little electric power. To this end, the following measures may be taken. For example, the optical sensor system may be designed such that it consumes little electric power for emitting the light and/or little electric power for evaluating the optical sensor. The optical sensor system may furthermore be designed in such a way that the signal for starting the authentication check only is rarely triggered. This is achieved, among other things, in that the detection area comprises a near zone and a far zone.

A fixed lens system has the advantage that the lens system can monitor the detection area, as well as the actuation area. This means that only one lens system is used for the detection area and for the actuation area.

According to the invention, it may furthermore be advantageous if the light module is spaced apart from the optical sensor by a distance d that particularly amounts to about 1 cm≤d≤3 cm, preferably to about 2 cm, and/or if the sensor system is designed such that the detection area approximately extends as far as 2 m. It proved advantageous if as many light beams of the light module as possible can also reach the reception area of the optical sensor such that the light module only has to emit low-intensity light. In this way, the light module consumes less electric power.

The invention likewise proposes that the operating signal is a signal for unlocking and/or locking and/or opening and/or closing a movable part of the motor vehicle, wherein the movable part particularly consists of a tailgate or a side door or a sliding door. The tailgate and/or the side door may be realized in the form of a sliding door. The movable part can be unlocked after the signal for opening the movable part has been generated. Subsequently, the movable part can be partially displaced from its closed position, particularly due to the resilience of a seal, and thereby partially opened. The operating signal may additionally or alternatively consist of a signal for activating a motor-driven opening and/or closing aid. In this case, the motor vehicle features a motor that completely opens and/or closes the movable part.

The signal for opening and/or closing the movable part particularly may consist of a signal for an electromechanical door lock.

Since the detection area is monitored and the authentication check is started if the user is detected in the detection area, the authentication check particularly can be started without requiring any activity of the user. In fact, the start of the authentication check preferably is initiated unnoticeable to the user. The optical sensor system therefore may initiate a passive keyless entry check. A passive keyless entry check refers to a process, in which an authentication check takes place unnoticeable to the user. In a passive keyless entry check, the user does not have to initiate the authentication check with a deliberate action.

It is conceivable that the detection area becomes smaller toward the optical sensor system in a top view. In this way, only specific users who will presumably approach the optical sensor system and/or the motor vehicle are detected.

For example, the assembly module may be designed for being installed such that the detection area is at least partially located above a ground area, on which the motor vehicle is parked. In this way, the detection area is not restricted to a small section of a ground area in front of the motor vehicle only. This naturally also applies to the actuation area. The detection area and/or the actuation area may begin above the ground area in the vicinity of the motor vehicle and then extend obliquely until it reaches the ground area. In this case, the detection area and/or the actuation area ends at the ground area. Alternatively, the detection area and/or the actuation area may at least partially end above the ground area. In a special embodiment, the detection area and/or the actuation area is completely located above the ground area, particularly at a defined distance from the ground area.

The light module, as well as the display element, may be advantageously aligned in such a way that the actuation area is located closer to the motor vehicle than the detection area, particularly that two actuation areas are provided. The actuation area may lie within the detection area, wherein the detection area is realized larger than the actuation area.

In order to trigger the operating signal for the vehicle, the optical sensor system is configured in such a way that the actuation area or the actuation areas must be "addressed" in accordance with a predefined action or gesture of the user. The operating signal for the motor vehicle cannot be made available if this is not the case.

The assembly module may be used, e.g., in the tail section of the motor vehicle, wherein the display element can be additionally used as license plate light. The assembly module may be additionally and/or alternatively designed for being arranged in an emblem of the motor vehicle. The assembly module may be alternatively and/or additionally suitable for being mounted on a side of the motor vehicle such as, e.g., in a B-pillar. In this way, different detection areas, in which a user usually approaches the motor vehicle, can be monitored with the optical sensor system. The optical sensor system also generates the actuation area after a positive authentication check in this case.

The optical sensor system is advantageously configured in such a way that a distance change is calculated in the near zone of the detection area and/or in the actuation area, namely when the user is located in the near zone or in the actuation area. In this case, at least two successive images, particularly detection images, are evaluated. The distance can be determined by means of a Time-of-Flight measurement. The optical sensor may have a resolution, in which 2 pixels correspond to the surface area of the body part. A variation of the pixel size is likewise conceivable. The choice of the pixel size makes it possible to lower the energy demand of the optical sensor system for monitoring the outside area of the motor vehicle.

The same light with respect to the wavelength and/or the duration of the light pulse can be advantageously emitted by the light module for monitoring the detection area and for monitoring the actuation area. The design of the optical sensor system is preferably not changed. For example, the light module may have the same emission area for monitoring the detection area as for monitoring the actuation area. The optical sensor may also have the same reception area for monitoring the detection area as for monitoring the actuation area. In this way, a cost-efficient optical sensor system can be provided for the assembly module.

Since the actuation area preferably has a smaller spatial extent than the detection area, it may be advantageous if the control unit of the optical sensor system only evaluates a small section of the image recorded by the optical sensor during the monitoring of the actuation area. This section corresponds to the image of the actuation area. The number of evaluated pixels may be smaller than the overall number of pixels. This also contributes to achieving a low-energy operation of the sensor system.

The display element may also be integrated within the optical sensor system. It is likewise conceivable that the display element can be mounted on the motor vehicle spaced apart from and structurally separate of the optical sensor system.

The optical sensor system or the entire assembly module may be designed for being arranged on the tail section of the vehicle, e.g. behind the rear window, in a handle strip, in an emblem, in a taillight, behind a rear reflector, on a bumper and/or in a gap between two components. The assembly module may alternatively or additionally be suitable for being mounted on a side of the vehicle such as, e.g., in a B-pillar. In this way, different detection areas, in which the user usually approaches the motor vehicle, can be monitored with the optical sensor system. The optical sensor system or the entire assembly module particularly can be concealed behind an externally opaque layer that, however, is transparent to the light of the optical sensor system. For example, a bumper, on which the optical sensor system is mounted, can therefore be painted.

The optical sensor system preferably is arranged on the motor vehicle such that little dirt accumulates. For example, the optical sensor system may be arranged behind the rear window in the wiping region of the windshield wiper or on the handle strip. The assembly module may alternatively or additionally feature a washing nozzle for cleaning the optical sensor system. In this case, the washing nozzle may automatically clean the optical sensor system, for example, when the windshield wiper for the front and/or rear window is actuated. The operation of a clean optical sensor system requires a lower light intensity such that energy savings can thereby also be achieved.

The intensity of the emitted light may depend on the brightness of the ambient light. The brightness of the ambient light can be determined by means of a brightness sensor.

If different user intentions can be detected during the monitoring of the actuation area, different gestures can be assigned to different user intentions. For example, stepping into the actuation area may cause the tailgate to open whereas a lateral motion of a hand near the optical sensor causes the trailer hitch to extend.

It would be conceivable that the removal of an object from the actuation area has to take place within a predefined removal period in order to make available the signal. The removal of an object within a predefined removal period may be part of the gesture. The beginning of the removal period can be perceived by the user. For example, a display element can assume several illumination states. In one of the illumination states, such a display element may emit light of constant brightness. In another illumination state, e.g., the brightness may change periodically. At the beginning of the actuation period, for example, the display element may emit light of constant brightness. The display element may blink during the removal period. The signal is only made available if the object, particularly a body part of the user, is removed from the actuation area within the removal period.

The assembly module and/or the motor vehicle may feature at least one means that makes it easier for the user to express the user intention in the actuation area in order to trigger the signal.

For example, the assembly module may emit an information signal indicating that the actuation period will end shortly. The information signal may begin, e.g., with a change of the illumination state of the display element. The information signal may correspond to another illumination state of the display element. For example, the display element may blink at the end of the actuation period. The means corresponds to a corresponding procedural specification in the monitoring unit.

In order to express a user intention, it may also be helpful to guide the user to the actuation area. This applies, in particular, if the user carries a large object and therefore can no longer perceive the end of the actuation area on the ground. To this end, the assembly module and/or the motor vehicle may feature means for generating a signal that can be perceived by the user, particularly a visible, audible or tactile signal. For example, the assembly module may feature lamps such as LEDs. The lamps can be arranged in such a way that they act as a guidepost. The lamps may be aligned, for example, such that markings leading to the actuation area are generated on the ground. The lamps may alternatively or additionally be arranged adjacent to one another. The lamps can be activated in a sequence that indicates the direction, in which the user has to move in order to reach the actuation area. Instead of the lamps, already existing light elements that are arranged adjacent to one another in the motor vehicle such as, e.g., the lamps of headlights, brake lights, blinkers or the like may also be used for this purpose. It would likewise be conceivable to provide the user with acoustically audible instructions of the required moving direction. In this case, the assembly module may feature a loudspeaker. It would furthermore be conceivable to inform the ID transmitter of the change in direction, wherein the ID transmitter generates different vibrations in order to point the user in the corresponding direction. If the user is informed of a change in direction, the optical sensor system determines the position of the user and the direction, in which the user has to move in order to reach the actuation area, and subsequently prompts the perceivable means to emit the corresponding signal.

It may likewise be helpful to the user that the position of the actuation area and/or the length of the actuation period is variable. This is particularly helpful when a physically handicapped user wants to express a user intention. This is likewise helpful when the actuation area is arranged in an unfavorable position for the user. This unfavorable position may be permanent. For example, the actuation area may end on a trailer hitch. Alternatively, the unfavorable position may only be unfavorable for a unique signal triggering process, e.g., because the actuation area ends at a puddle. A predefined user action may particularly be required in order to change the position of the actuation area and/or the length of the actuation period. For example, the user can change the position of the actuation area and/or the length of the actuation period with a corresponding input in a user menu, e.g., of a motor vehicle control unit or an ID transmitter. The predefined user action may alternatively be detected by the optical sensor system. In another alternative, the assembly module can be transferred into a learning mode, in which the assembly module learns the changed position of the actuation area and/or the changed length of the actuation area.

It may likewise be helpful to the user that the actuation area is monitored anew in order to detect a user intention and thereby trigger a operating signal after a first actuation period has elapsed without the detection of a user intention. This is particularly helpful if the user was distracted and did not reach the actuation area in time or if the user did not make the correct gesture. It is therefore conceivable to successively monitor the actuation area multiple times, particularly two or three times. The repeated monitoring of the actuation area can be automatically initiated. Alternatively, a predefined user action may be required in order to monitor the actuation area anew for another actuation period. This can be achieved, for example, in that a capacitive sensor responds to the user. Alternatively, the predefined user action may be detected by the optical sensor system.

For example, the predefined user action, which is detected by the optical sensor system and causes a change in the position of the actuation area and/or the actuation period and/or the repeated monitoring of the actuation area in order to detect a user intention, may consist of one of the following user actions: a predefined gesticulation within the actuation and/or detection area such as moving a body part of the user back and forth, a non-removal of the body part if its removal was expected or a movement of the user into the detection and/or actuation area and/or out of the detection and/or actuation area. The body part may particularly be a hand or a foot. It would also be conceivable that the user exits the detection area for a predefined period of time and then reenters the detection area.

The display element also indicates when the actuation area is monitored anew in order to detect a user intention. The display element likewise indicates when the position of the actuation area is changed. To this end, the display element may feature several lamps, e.g. LEDs. One or more lamps respectively visualize an actuation area at least partially. The actuation area with the changed position preferably lies within the detection area. The corresponding pixels are evaluated depending on the actuation area being monitored.

A position of the ID transmitter may be checked during or after an authentication and before the signal is triggered. This can be realized by determining the intensity of a signal emitted by the ID transmitter. For example, the Receive Signal Strength Indicator (RSSI) may be used for this purpose. The determination of the intensity of the emitted signal makes it possible to ascertain whether the user is located in front of, adjacent to or behind the motor vehicle. In this way, it can be ensured that only the authorized user himself has reached the detection area and expressed a user intention in the actuation area. It is conceivable to query the RSSI cyclically.

Light of different wavelengths likewise makes it possible to save energy. For example, the monitoring of the detection area may up to the unique detection of an arbitrary object in the detection area take place with light of a longer wavelength than the subsequent check of other requirements with respect to the detection of a user. For example, light with a wavelength of 905 nm may initially be used. Once an object is detected in the detection area, for example, light with a wavelength of 800 nm may be used. The wavelength may alternatively become shorter as the object moves from the far zone into the near zone.

The above-defined objective is also attained by means of a method as described herein. The method for triggering an operating signal for a motor vehicle utilizes an optical sensor system for carrying out the following steps:
a) monitoring a detection area located outside the vehicle,
b) triggering a signal for starting an authentication check between an ID transmitter and the motor vehicle if a user is detected in the detection area,
c) monitoring an actuation area that is located outside the vehicle and differs from the detection area,
d) making available an operating signal for the vehicle in case a user is detected in the actuation area,
wherein an emergency actuation is additionally provided for carrying out the following step:
e) additionally making available the operating signal for the motor vehicle upon activation of the emergency actuation with a body part of the user.

The advantages of the inventive method essentially correspond to the above-described advantages of the inventive assembly module. As mentioned above, the inventive method preferably is a method that can be carried out with the assembly module. The authentication particularly may be a passive keyless entry check. A few essential points of the invention are elucidated again below, wherein we refer to the general description of the inventive assembly module for more detailed explanations that likewise apply to the inventive method.

It is advantageous that the detection area is permanently monitored. In case of a malfunction, the user can trigger the operating signal by activating the emergency actuation, particularly with a defined action and/or gesture deliberately carried out by the user. In this context, the emergency actuation may be activated in a capacitive and/or inductive and/or contactless fashion. Step e) advantageously can be carried out in case the optical sensor system is defective and/or dirty.

The emergency actuation advantageously can only be activated if it is detected that the optical sensor system is defective and/or dirty. For example, a control device may be provided in the assembly module and responsible for this detection. The control device only enables the activation of the emergency actuation if the optical sensor system is defective or dirty. According to the invention, however, it is additionally and/or alternatively also conceivable that the emergency actuation can always be activated by the user.

According to another enhancement of the invention, an authentication check between the ID transmitter and the motor vehicle can be carried out after an activation of the emergency actuation in accordance with step e), wherein the operating signal for the motor vehicle is only made available after a positive authentication check.

If it is detected that the optical sensor system is dirty, the sensor system advantageously is operated with increased power, particularly for monitoring the detection area and/or the actuation area and/or for generating the detection area and/or the actuation area.

It is advantageous that the detection area is permanently monitored. However, the optical sensor system only requires little energy for reliably monitoring the detection area. The detection area advantageously is divided into at least two zones, namely into a near zone and into a far zone, wherein the near zone is spaced apart from the sensor system by a shorter distance than the far zone, and wherein the detection of the user in accordance with step b) is not carried out until the user is located in the near zone. According to the invention, the sensor system may emit light in the invisible range. It is conceivable that the sensor system emits pulsed light. The sensor system may according to the invention also be switched between a sleep mode and a operating mode, wherein the sensor system remains in the sleep mode until the user enters the near zone. In this way, energy can be saved while the method is carried out. The pulse frequency advantageously is lower in the sleep mode than in the operating mode. The light module may likewise emit several light pulses successively in order to generate the image. In addition, the control unit may only evaluate a section of the image recorded by the optical sensor in step a) during the monitoring of the detection area or in step d) during the monitoring of the actuation area. This also makes it possible to save energy.

An access control system of a motor vehicle preferably transmits a wake-up signal to the ID transmitter in step b). Subsequently, the ID transmitter transmits an authentication code to the access control system of the motor vehicle. The access control system then compares the authentication code with a stored code. If applicable, a signal, particularly an unlocking signal and/or a signal for monitoring the actuation area, can be triggered if the codes correspond. Consequently, step c) and step d) can be carried out.

According to the inventive method, a distance change of a user located in the detection area or in the actuation area can be reliably determined by emitting pulsed light with the aid of the sensor system. The method advantageously utilizes a display element that emits light in the visible range for step c) in order to thereby generate an actuation area for the user, particularly such that the actuation area lies within the detection area.

With respect to its spatial extent, the actuation area typically is realized smaller than the detection area. The actuation area advantageously is spaced apart from the motor vehicle, particularly from the sensor system, by a shorter distance than the detection area.

According to an enhancement of the invention, the sensor system may feature a sensor that receives light from the detection area and/or the actuation area, wherein the sensor system features a control unit that evaluates the data of the sensor. The inventive method may furthermore utilize a sensor system that emits a plurality of light beams, particularly cones of light, which may collectively form the detection area and/or the actuation area. The sensor system therefore may feature a plurality of light sources that emit pulsed light into the detection area.

The wavelength of the pulsed light advantageously lies in the invisible range such that the user is detected unnoticeably in step b) and the authentication check therefore also takes place unnoticeably. The actuation area advantageously lies within the detection area, wherein the actuation area differs from the detection area with respect to its size, particularly such that the actuation area is smaller than the detection area. If the user carries out a deliberate action within the actuation area, the user is still located in the detection area, wherein the light module continues to emit light in the invisible range in step c). This light is advantageously pulsed such that a distance change caused by a movement of the user in the actuation area can also be determined in the actuation area. The control unit only decides to make available an operating signal for the motor vehicle if a defined distance change takes place.

According to an enhancement of the invention, the sensor system checks for a distance change in order to detect a user who approaches the motor vehicle in the detection area and/or in the actuation area, wherein the sensor system particularly does not carry out a check for a distance change until the user is located in the near zone. This makes it possible to save energy during the permanent monitoring of the detection area. The inventive method may furthermore be realized in such a way that the sensor system receives and/or records images of the detection area and/or the actuation area, wherein the images consist of pulsed images and non-pulsed images, wherein the pulsed images are produced by the reflection of the pulsed light emitted by the sensor system and the non-pulsed images are produced by the light of the detection area and/or the actuation area, and wherein the pulse frequency of the emitted light particularly is lower in the sleep mode than in the operating mode.

The detection of the user in accordance with step b) or d) only takes place if the user moves in the detection area or in the actuation area. For example, the pixels forming the object in two successively recorded images, particularly detection images, can be compared with one another for this purpose. A distance of the object from the optical sensor may additionally or alternatively be measured in at least two successively recorded images, particularly detection images. If different distances are detected, the object respectively has moved in the detection area or in the actuation area. For example, a Time of Flight measurement may be carried out in order to determine the distance of the object from the optical sensor. In this case, one or more light pulses are emitted and the time required by the light pulse to travel to the object and from the object to the optical sensor is measured. In this case, the time is proportional to the distance of the object.

According to the invention, it is furthermore conceivable that the user is only detected in the detection area in step b) if the object approaches the optical sensor system and/or the motor vehicle in the detection area. In other words, a mere movement of the object in the detection area does not suffice for triggering the signal for starting the authentication check. A signal for starting the authentication check is only triggered if the distance of the object from the optical sensor and/or from the motor vehicle decreases. For this purpose, the distance of the object from the optical sensor is measured in at least two successively recorded images, particularly detection images. A Time of Flight measurement may be carried out in order to measure the distance. An authentication check is not carried out if the user is merely located in the detection area and does not approach the optical sensor system such that the inventive method can be carried out in an energy-saving fashion. Step b) is only triggered if a significant approach of a user or an object takes place within the detection area. Step b) particularly is carried out when the object or the user enters the near zone.

The check of the detection area is advantageously carried out by comparing the pulsed images with the non-pulsed images, wherein the pulsed images particularly are compared with the non-pulsed images in order to check for a distance change. In this case, each image may be composed of a total number of pixels, wherein the check of the detection area and/or the actuation area is carried out by checking a number of pixels that is smaller than the total number of pixels.

According to the invention, the method can furthermore be enhanced to the effect that additional signals for initiating other vehicle functions can be triggered with defined movements of the body part of the user in the detection area and/or actuation area. It is conceivable to carry out the following actions on the motor vehicle:

opening and/or closing a window of the motor vehicle
opening and/or closing the engine hood of the motor vehicle
opening and/or closing the fuel tank cap of the motor vehicle
activating and/or deactivating an auxiliary heating system or a window heating system of the motor vehicle
activating and/or deactivating a light function of the motor vehicle
folding in and/or folding out a side mirrors of the motor vehicle
activating and/or deactivating an alarm system of the motor vehicle
adjusting a user-specific setting in the motor vehicle, particularly the setting of the driver's seat
retracting and/or extending a trailer hitch.

The requirements for the detection of a user in step b) and/or d), i.e. the detection period, the size of the object, the movement of the object, the approach of the object, etc., can be arbitrarily combined. For example, the object must have a predefined size and approach the optical sensor in order to be detected as a user and to trigger a signal for starting an authentication check.

The inventive method may utilize a sensor system with a light-emitting light module such that an emission area is generated, wherein the sensor has a reception area that at least partially coincides with the emission area, and wherein the coinciding area forms the detection area. This means that the detection area may be formed by the superposition of an emission area of the light module and a reception area of the optical sensor. The emission area of the light module is defined by the area, into which the light module emits light of sufficient intensity. The reception area is defined by the area, from which light can be received by the optical sensor. The emission area of the light module may be composed of the emission areas of individual light sources. The emission area may alternatively be restricted to the superposition of the emission areas of the individual light sources.

In step b), the ID transmitter preferably transmits an authentication code to the access control system of the motor vehicle and the access control system compares the authentication code with a stored code, wherein an unlocking signal is triggered if the codes correspond. It is advantageous that step d) is only carried out if a defined movement of a body part of the user takes place in/on the actuation area, wherein the body part particularly is a foot or a hand of the user.

In a potential embodiment of the invention, the actuation area is located on the ground, on which the user has to place a foot for step d), particularly for a defined period of time only, in order to ultimately trigger an operating signal in accordance with step d). In this case, the user may have to place a foot on the ground through the actuation area. According to the invention, the method may be carried out in such a way that the user has to place a foot into the actuation area within a defined time window. Step d) cannot be initiated if the user does not carry out this action.

It is likewise conceivable that the actuation area is spaced apart from the ground and from the sensor system, wherein the actuation area particularly comprises a hologram. According to the invention, the actuation area may be located, for example, at the height of the sensor system and a short distance from the motor vehicle. The user merely has to move into this actuation area with a body part in order to generate the operating signal for the motor vehicle.

Figure 4:
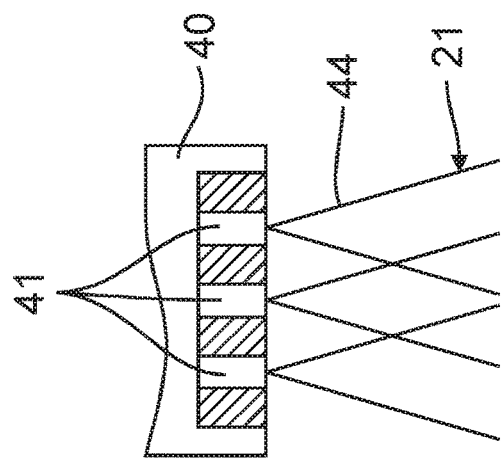
Figure 3:
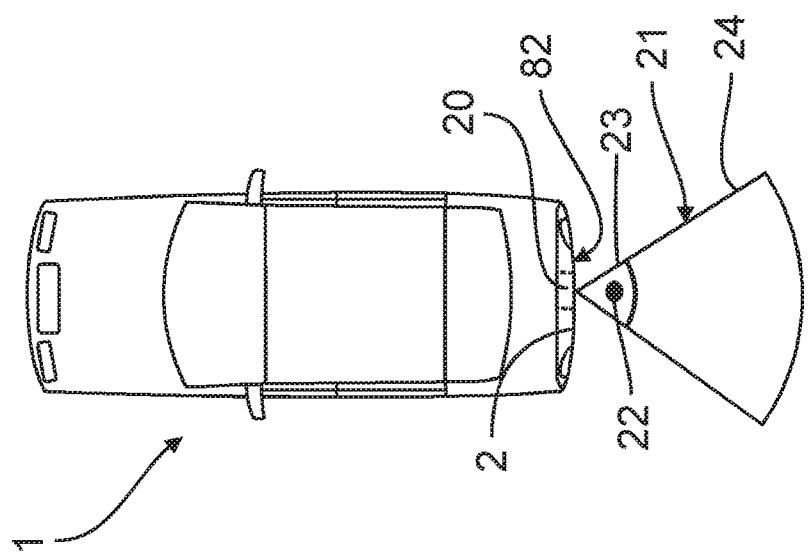
Figure 2:
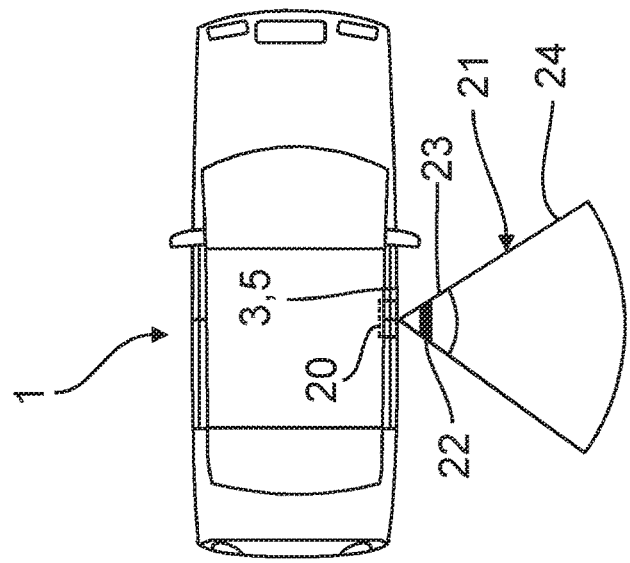
Figure 10:
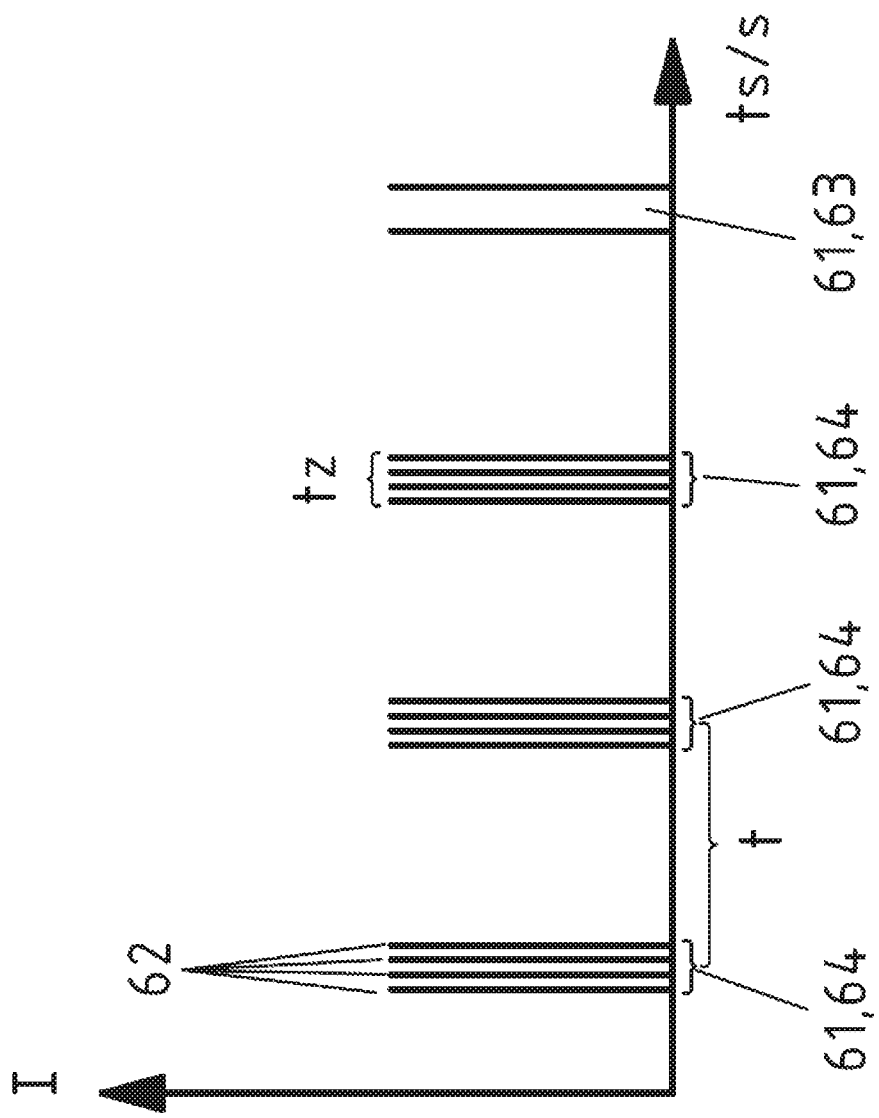
Figure 13:
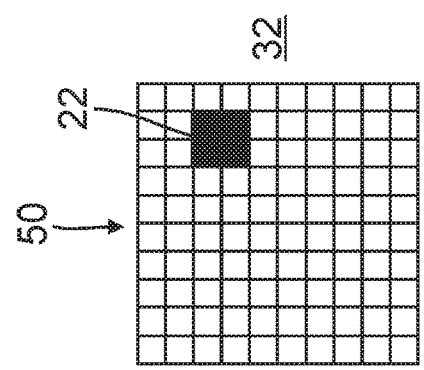
Figure 12:
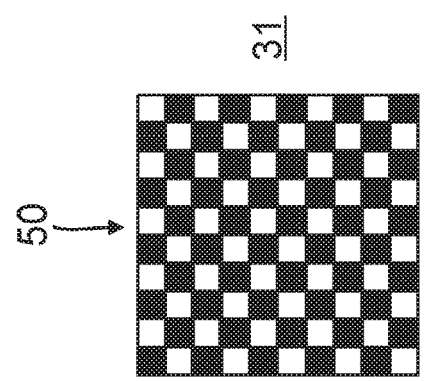
Figure 11:
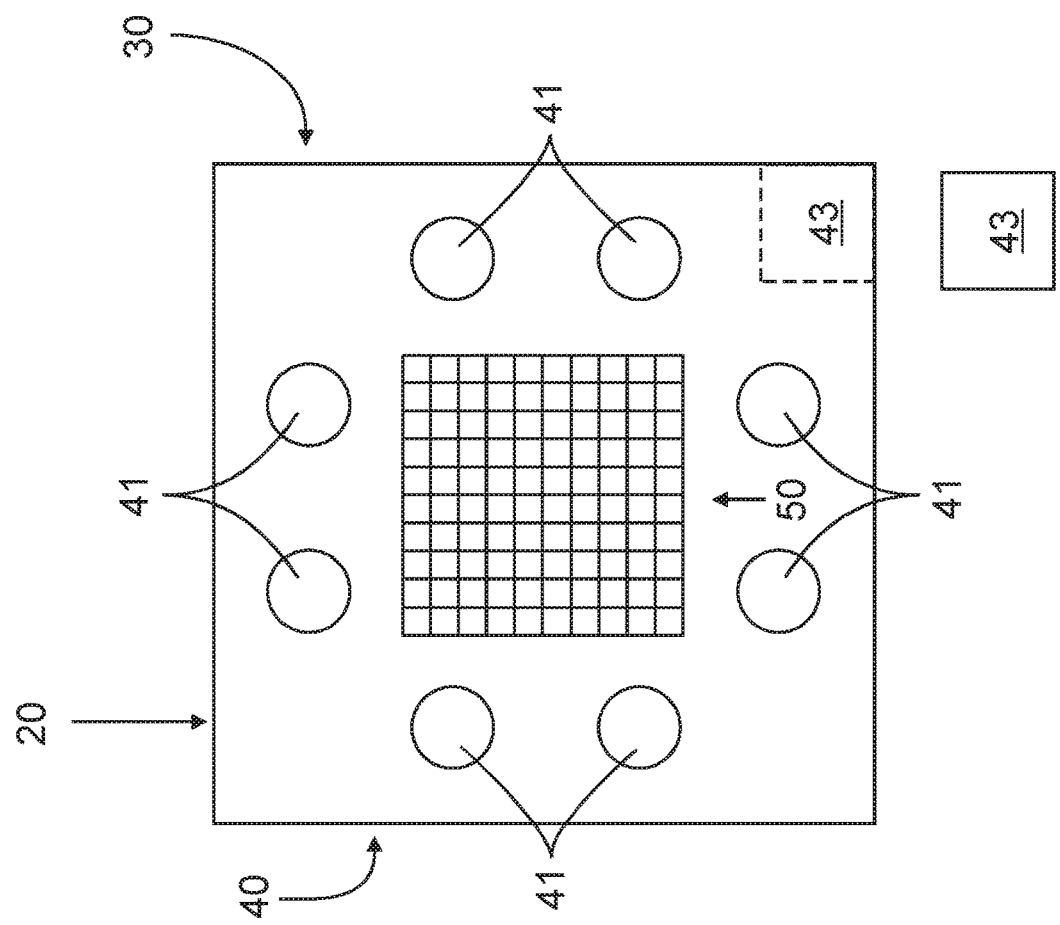
Figure 14:
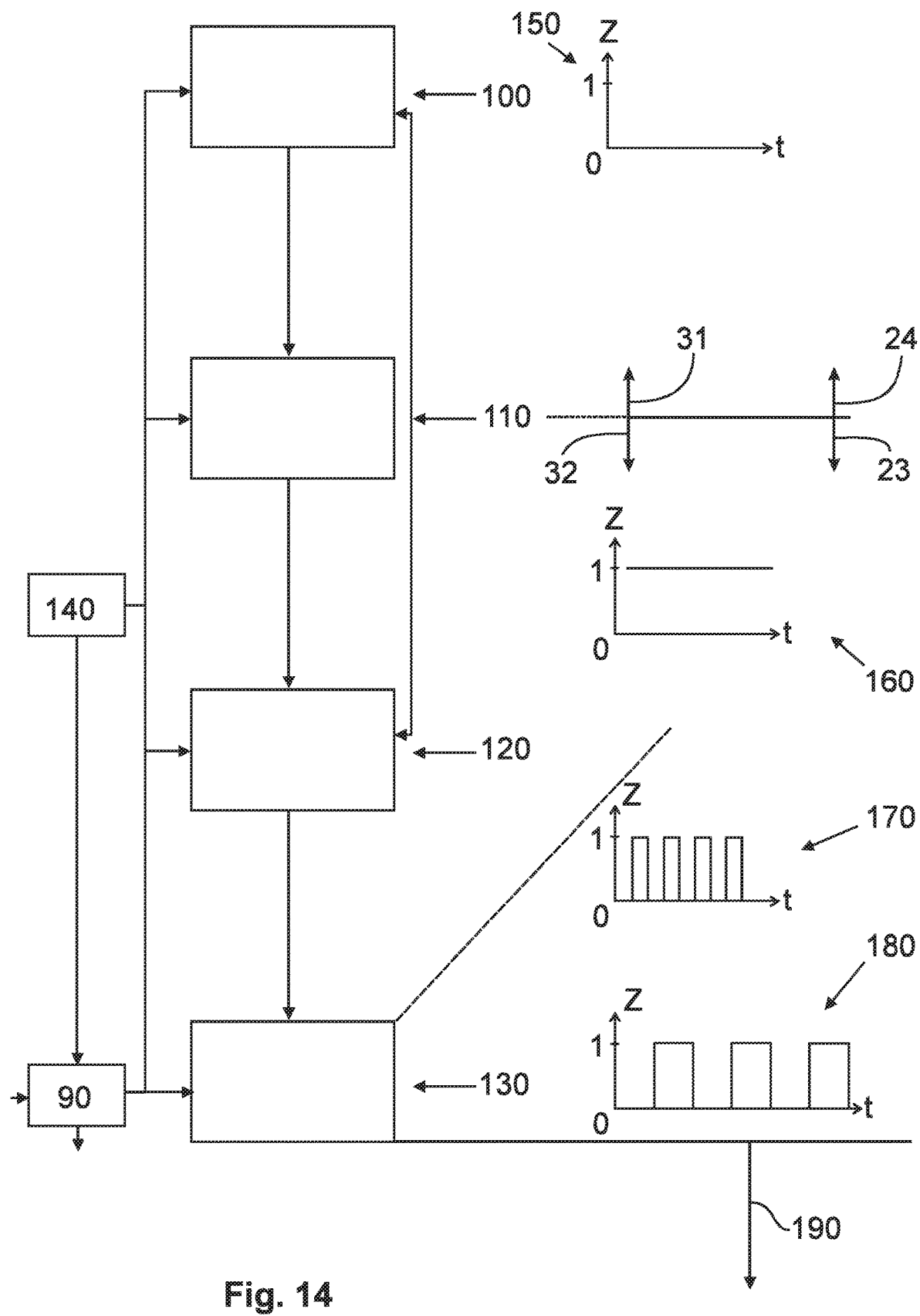

Other enhancements of the invention can be gathered from the following description of exemplary embodiments of the invention that are schematically illustrated in the drawings. All characteristics or advantages disclosed in the claims, the description or the drawings including constructive details, spatial arrangements and procedural steps may be essential to the invention individually, as well as in various combinations:

FIG. 1 schematically shows an assembly module for a motor vehicle with an optical sensor system that monitors a detection area and an actuation area, FIG. 2 shows a schematic top view of a motor vehicle equipped with an optical sensor system according to FIG. 1, FIG. 3 shows a schematic top view of a motor vehicle with an optical sensor system according to FIG. 1, FIG. 4 shows a schematic illustration of a light module of an optical sensor system, FIG. 5 shows a top view of a motor vehicle featuring an assembly module with an optical sensor system, FIG. 6 shows a side view of the motor vehicle according to FIG. 5, FIG. 7 shows another side view of a motor vehicle with an assembly module according to FIG. 1, FIG. 8 shows another exemplary embodiment of an assembly module with an optical sensor system for monitoring a detection area and an actuation area, FIG. 9 shows an exemplary embodiment of a motor vehicle emblem, into which an optical sensor system for monitoring a detection area and an actuation area is integrated, FIG. 10 shows an illustration of the radiation intensity emitted by an optical sensor system for monitoring the detection area and/or the actuation area as a function of the time, FIG. 11 shows a schematic illustration of an optical sensor of the sensor system, FIG. 12 shows an illustration of the optical sensor according to FIG. 11 in an evaluation mode, FIG. 13 shows the optical sensor according to FIG. 12 in a second evaluation mode, FIG. 14 shows a potential operating sequence of an assembly module according to FIGS. 1-13, and FIG. 15 shows a schematic illustration of a sensor system that checks for a distance change.

FIG. 1 shows an assembly module 20 that can be used in a motor vehicle 1. The assembly module 20 features an optical sensor system 30 that is suitable for monitoring the environment near the motor vehicle 1. The assembly module 20 is electronically connected to motor vehicle electronics integrated into the motor vehicle 1, wherein an operating signal for the motor vehicle 1 can be generated upon the detection of a user 10, for example, in order to unlock and/or lock and/or open and/or close a movable part 2, 3 of the motor vehicle 1. The movable part 2, 3 may consist, e.g., of a tailgate 2 or of a side door 3 or a sliding door 3.

The optical sensor system 30 features an optical sensor 50 and a light module 40, wherein the light module 40 can emit light 44 such that a detection area 21 is generated. The assembly module 20 also comprises a display element 43 that can generate an actuation area 22. The light module 40 furthermore features a plurality of light sources 41 that are schematically illustrated in FIG. 4 and FIG. 11. The light module 40 is furthermore spaced apart from the optical sensor 50 by a distance that may lie in a range d between 1 cm≤d≤3 cm in the present exemplary embodiment. The optical sensor 50 is realized in such a way that light 44 is received from the detection area 21 and/or from the actuation area 22. In the exemplary embodiment shown, the detection area 21 is invisible to the user 10, wherein the light module 40 is designed for emitting light 44 in the form of IR radiation.

The light module 40 according to FIG. 1 may feature a lens system 42 that is realized, for example, with an explicitly not-shown additional filter. FIG. 1 furthermore shows a control unit 60 that is suitable for evaluating data of the sensor 50. The control unit 60 may also fulfill other functions as described in greater detail further below. The control unit 60 advantageously is integrated within the assembly module 20. It is likewise conceivable to arrange the control unit 60 in the motor vehicle, wherein an electronic connection is respectively produced between the control unit and the assembly module 20 or the optical sensor system 30 in this case.

In all exemplary embodiments, the assembly module 20 is arranged in a receptacle 25 that is designed for installing the assembly module 20 on the motor vehicle 1. The assembly module 20 and/or the receptacle 25 is in all exemplary embodiments suitable for being arranged on the tail of the motor vehicle (FIG. 3, FIG. 5, FIG. 6 and FIG. 8) or on a side of the vehicle (FIG. 2 and FIG. 7). The assembly module 20 may be mounted, for example, on the B-pillar of the motor vehicle 1 (see FIG. 7). According to the invention, the inventive assembly module 20 likewise may be at least partially integrated into the door handle 5 as schematically illustrated in FIG. 7.

FIG. 1 shows that the assembly module 20 is provided on a handle strip 6 of the motor vehicle 1, wherein the handle strip may form part, for example, of a door handle or a tailgate handle. The optical sensor 50 may furthermore be equipped with a lens system 51 of the type illustrated in FIG. 1. FIG. 8 and FIG. 9 show an exemplary embodiment, in which the assembly module 20 is provided in an emblem 80 of the motor vehicle 1. The light module 40 and the display element 43 are aligned in such a way that the actuation area 22 is significantly smaller than the detection area 21.

In FIG. 8 and FIG. 9, the optical sensor system 30 furthermore features a lighting element 45 in order to visualize different illumination states, which are illustrated in an exemplary fashion in FIG. 14, for the user 10. The lighting element 45 may also function as display element 43 as described further below. According to FIG. 9, the emblem 80 features different segments 81, wherein one of the following components is respectively arranged in a segment 81: light module 40, display element 43 and optical sensor 50. The lighting element 45 may likewise be integrated into one of the segments 81. In the context of the invention, it is also conceivable that the emblem 80 is movably arranged on the motor vehicle 1. In a first position, for example, the optical sensor system 30 could be located behind the emblem 80 and thereby protected. A check of the detection area 21 and/or the actuation area 22 could conceivably be carried out in a second position.

According to FIG. 1, it is conceivable to arrange the display element 43 in the motor vehicle rather than in the assembly module 20. The display element 43 is electrically connected to the control unit 60. It is according to FIG. 1 furthermore conceivable to provide an emergency actuation 90 within the assembly module 20, wherein an operating signal for the vehicle 1 can be made available upon activation of the emergency actuation 90 with a body part 12 of the user 10. This emergency actuation 90 enables the user 10 to trigger the aforementioned operating signal for the motor vehicle 1 in case the optical sensor system 30 is dirty or malfunctions. In such instances, the emergency actuation 90 can be activated by the user 10 in order to trigger the operating signal for the motor vehicle 1. In this case, the emergency actuation 90 features an activating means 91, e.g., in the form of a push-button or a switch, wherein the activating means 91 may operate in a capacitive or inductive or contactless fashion. The activating means may likewise consist of a piezo-element. If the sensor system 30 has accumulated significant dirt such that the optical sensor system 30 cannot adequately monitor the detection area 21 and/or the actuation area 22, the sensor system 30 can be operated with increased power in order to sufficiently monitor the detection area 21 and/or the actuation area 22.

According to FIG. 1, the optical sensor system 30 can monitor the surroundings of the motor vehicle 1, particularly a detection area 21, wherein the detection area is divided into a near zone 23 and a far zone 24. The near zone 23 is spaced apart from the sensor system 30 by a shorter distance than the far zone 24. The inventive sensor system 30 permanently monitors the detection area 21, namely also when the user 10 is located outside the detection area 21. The monitoring of the detection area 21 is also schematically indicated with the reference symbol 100 in FIG. 14. If the user 10 enters the near zone 23 within the detection area 21, a signal for starting an authentication check between an ID transmitter 13 carried along by the user and the motor vehicle 1 is triggered, wherein this signal is schematically indicated with the reference symbol 110 in FIG. 14. If positive authentication is established, i.e. if the user 10 carrying the ID transmitter 13 is authorized to make available an operating signal for the motor vehicle 1, step 120 according to FIG. 14 is carried out, wherein an actuation area 22, which is located outside the motor vehicle 1 and differs from the detection area 21, is monitored in this step. In all exemplary embodiments, the sensor system 30 emits light in the invisible range in order to generate the detection area 21. Pulsed light is advantageously emitted by the sensor system 30, particularly by the light module 40. The user 10 can now activate the actuation area 22 with a defined movement, gesture, etc., which is detected by the sensor system 30. If the user 10 is detected in the actuation area 22, the operating signal for the motor vehicle 1 is made available as illustrated in step 130 in FIG. 14.

The assembly module 20 may be in data communication with an access control system 14 of the motor vehicle 1, wherein the operating signal may serve for correspondingly addressing, for example, a door lock 8 that can thereby be unlocked and/or locked in order to open or close a tailgate or a door of the motor vehicle 1. The gesture of the user 10 may be defined differently in the actuation area 22, for example such that the user 10 steps on the visible actuation area 22 with a foot 11 (see FIG. 6). FIG. 5 shows another variation, in which two actuation areas 22 are visualized and have to be activated by the user 10 in order to initiate step 130 in FIG. 14. It is particularly advantageous that the detection area 21 is permanently monitored, namely also when the user according to FIG. 1 is located outside the detection area 21. In FIG. 1, the actuation area 22 lies within the detection area 21, wherein the light module 40 continues to emit invisible light during the monitoring of the actuation area 22 such that the detection area 21 is generated, and wherein the optical sensor 50 simultaneously checks the actuation area 22. In this case, the sensor 50 receives light from the detection area 21, as well as light from the actuation area 22. This data and/or these signals is/are recorded by the image sensor 50, wherein the control unit 60 carries out the evaluation of the data. The control unit 60 may also be integrated into the image sensor, particularly the optical sensor 50.

FIG. 4 shows that the sensor system 30 can in all exemplary embodiments emit a plurality of light beams 44 that collectively form the detection area 21. The light module 40 therefore features a plurality of light sources 41 that respectively emit individual light beams 44 into the area located outside the motor vehicle 1 in order to thereby generate the detection area 21. In this case, it is advantageous that the light intensity of the individual light sources 41 can be significantly reduced such that the energy consumption of the optical sensor system 30 can be lowered.

FIG. 15 schematically shows a sensor system 30 that can carry out a check for a distance change in FIG. 1, as well as in the remaining exemplary embodiments, in order to detect a user 10 who approaches the motor vehicle 1 in the detection area 21 and/or in the actuation area 22. The light module 40 emits invisible light in the direction of the actuation area 22, wherein the time between the emission of this light by the light module 40 and its reception by the optical sensor 50 is designated as $t_1$. If a user 10 approaches the actuation area 22 as illustrated in FIG. 15 b, the time $t_2$ is now required for the light 44 to travel from the light module 40 to the optical sensor 50. In this way, the inventive method acquires the valuable information that a user 10 approaches the motor vehicle 1. A distance check advantageously is not carried out until the user 10 is located in the near zone 23. In this way, the energy consumption of the assembly module can be minimized during its operation. In all exemplary embodiments, the sensor system 30 can receive images of the detection area 21, as well as of the actuation area 22. The images advantageously are pulsed images and non-pulsed images, wherein the pulsed images are produced by a reflection of pulsed light 44 emitted by the sensor system 30 and the non-pulsed images are produced by the light of the detection area 21 and the actuation area 22. Due to the use of pulsed light, extraneous light from the surroundings can be effectively filtered out by calculation such that the detection area 21 and the actuation area 22 can be reliably monitored.

During the check of the detection area 21 and of the actuation area 22, the pulsed images are compared with the non-pulsed images, wherein the aforementioned check for a distance change particularly is carried out by comparing the pulsed images with the non-pulsed images. In order to minimize the energy consumption of the inventive assembly module 20, the sensor system 30 can be switched between a sleep mode 31 and an operating mode 32 that is illustrated in FIG. 14. FIG. 11 schematically shows the sensor 50 with the light sources 41 arranged adjacent thereto. The display element 43 may be integrated into the light module 40. It is likewise conceivable to arrange the display element 43 remotely from the light module 40. The sensor 50 features a plurality of grid-shaped pixels. FIG. 12 shows the sleep mode 31 of the optical sensor 50, in which only half the pixels are evaluated. FIG. 9 shows the operating mode 32, in which only 4 pixels corresponding to the actuation area 22 are checked and evaluated. The remaining pixels are not evaluated. The white pixels illustrated in FIG. 8 and FIG. 9 are not taken into account in the evaluation such that energy can be saved during the operation of the assembly module 20.

FIG. 10 shows a diagram, in which the light intensity I is plotted as a function of the time ts. According to this figure, an image 61 is recorded with the aid of the sensor 50 after each time interval t, wherein FIG. 10 respectively shows the time interval required for an image 61. This image may consist of a detection image 64 or of a reference image 63. The detection image 64 was recorded with the aid of light pulses 62 of the light module 40. In this respect, a plurality of light pulses 62 is required for generating an image 61. The light pulses 62 are emitted by the light module 40 with a predefined pulse frequency. In this context, the pulse frequency may be lower in the sleep mode 31 than in the operating mode 32. The image frequency defined by the time interval t likewise may be lower in a sleep mode 31 than in a operating mode 32. The light of the light pulses 62 of an image 61 received by the sensor 50 is integrated or added up in order to generate the images 61. In order to carry out a distance measurement, the optical sensor system 30 specifies a time interval tz, in which the light pulses 62 generate an image 61. The distance of the user 10 from the optical sensor 50 is determined in dependence on the intensity of the light pulses 62 in the time interval tz. The reference image 63 is recorded in the form of an image 61, in which no light pulses 62 of the light module 40 reach the image sensor 50. The light module 40 does not emit any light for recording the reference image. The pulsed light according to FIG. 10 can be used, for example, in FIG. 1 and in all exemplary embodiments, particularly for filtering out extraneous light by calculation.

The actuation area 22 may be located on the ground 15 in all exemplary embodiments. However, it is likewise conceivable that the actuation area 21 is located at a distance from the ground 15 and at the height of the sensor system 30, particularly at the height of the emblem 80. The actuation area 22 should only be visible to the user 10 in order to address this actuation area 22 with a corresponding action or gesture. For example, the actuation area 22 may be realized in such a way that a hologram is generated for the user 10, wherein this hologram has to be activated by the user such that it is suspended in air in front of the optical sensor system 30 and at a distance from the motor vehicle 1 and from the ground 15. According to the invention, it is naturally also possible to trigger other signals on the motor vehicle such as, e.g., the movement of a window if the user 10 carries out the corresponding action in step 130 according to FIG. 14.

In FIG. 8 and FIG. 9, the optical sensor system 30 features a lighting element 45 that can be switched into different illumination states as schematically illustrated in FIG. 14. The lighting element 45 is deactivated while the detection area 21 is monitored in step 100 and therefore does not emit any light as indicated with the reference symbol 150. If a positive authentication check is established in step 110, the lighting element 45 assumes a first illumination state that is identified by the reference symbol 160 in FIG. 14. In the present exemplary embodiment, permanent light is generated on the lighting element 45 and can be detected by the user 10. This is followed by step 120, in which the actuation area 22 is checked by the sensor system 30. The first illumination state 160 instructs the user 10 to move a hand into the proximity of the emblem 80, particularly to activate the actuation area 22 located near the emblem 80. Once the user 10 has carried out this action, the lighting element 45 switches into the second illumination state 170 that represents a blinking signal. In this way, the user 10 is instructed to remove the hand from the actuation area 22. The lighting element 45 subsequently switches into a third illumination state 180 that likewise represents a blinking signal, but the individual light signals are active longer than the shorter light signals in the illumination state 170.

Dirt or a malfunction can be detected in step 140, wherein the control unit 60 receives, for example, the information of step 140. It is conceivable, for example, that the emergency actuation 90 is respectively activated or enabled in step 140 such that an operating signal for the motor vehicle 1 can be triggered in accordance with step 130 with a manual activation of the emergency actuation 90 by the user 10.

The assembly module 20 illustrated in FIG. 1 can be used in the tail area 82 in accordance with FIG. 5, FIG. 6 and FIG. 8, as well as in a side area of the motor vehicle in accordance with FIG. 7. In this context, the steps according to FIG. 14 can be applied to all exemplary embodiments in FIG. 1 through FIG. 9, as well as in FIG. 15. FIG. 9 may also include the assembly module 20 and/or the steps according to FIG. 14. FIG. 8 may also be enhanced to the effect that the lighting element 45 functions as the display elements 43 according to FIG. 1. It is furthermore conceivable that the illumination of the license plate 7 (FIG. 8) is realized by means of the display element 43 and/or the lighting element 45. FIG. 2 and FIG. 3 clearly show that a very large detection area 21 can in fact be monitored by means of the inventive optical sensor system 30. However, since the near zone 23, as well as the actuation area 22, is very small in comparison with the detection area 21, the optical sensor system 30 can be operated in an energy-saving fashion. The concept of switching the optical sensor system 30 between a sleep mode 31 and an operating mode 32 and of only carrying out an authentication check according to step 110 when the user 10 is located in the near zone 23 significantly contributes to these energy savings.

LIST OF REFERENCE SYMBOLS

1 Motor vehicle
2 Tailgate (movable part)
3 Side door, sliding door (movable part)
4 B-pillar
5 Door handle
6 Handle strip
7 License plate
8 Door lock
10 User
11 Foot
12 Hand
13 ID transmitter
14 Access control system
15 Ground
20 Assembly module
21 Detection area
22 Actuation area
23 Near zone
24 Far zone
25 Receptacle
30 Optical sensor system
31 sleep mode
32 Operating mode
40 Light module
41 Light source
42 Lens system
43 Display element
44 Light, light beam, cone of light
45 Lighting element
50 Optical sensor
51 Lens system
60 Control unit
61 Pulsed image
62 Light pulse
63 Reference image
64 Detection image
80 Emblem
81 Segments
82 Motor vehicle tail
90 Emergency actuation
91 Activating means, push-button, switch
100 Step
110 Step
120 Step
130 Step
140 Step
150 Illumination state
160 Illumination state
170 Illumination state
180 Illumination state

The invention claimed is:

1. An assembly module for a motor vehicle comprising:
an optical sensor system configured for
　a) monitoring a detection area located outside the vehicle,
　b) triggering a signal for starting an authentication check between an ID transmitter and the motor vehicle if a user is detected in the detection area,
　c) monitoring an actuation area that is located outside the vehicle and differs from the detection area,
　d) triggering an operating signal for the vehicle in case a user is detected in the actuation area; and
an emergency actuation for additionally triggering the operating signal and configured for
　e) triggering the operating signal for the vehicle upon activation of the emergency actuation with a body part of the user,
wherein the assembly module comprises the emergency actuation, and the emergency actuation comprises an activator, so that the user is able to activate the emergency actuation in order to make available the operating signal for the vehicle by actuating the activator, which is accessible to the user, and
wherein one optical sensor and the activator is integrated in the assembly module, the optical sensor monitors the detection area and monitors the actuation area, and the optical sensor system optically monitors the detection area and the actuation area which have different spatial dimensions.

2. The assembly module according to claim 1, wherein
the emergency actuation comprises a push-button or a switch.

3. The assembly module according to claim 1, wherein
the activating means operates in a capacitive or inductive or contactless fashion or with a piezo-element.

4. The assembly module according to claim 1, wherein
the sensor system is configured for at least monitoring or generating the detection area or the actuation area with increased power, particularly when the sensor system is dirty.

5. The assembly module according to claim 1, wherein
the optical sensor system comprises a sensor and a light module from which light can be emitted in order to generate a detection area, wherein the sensor is designed for receiving light from at least the detection area or the actuation area, and wherein the detection area particularly is invisible to the user.

6. The assembly module according to claim 1, wherein
a display element is provided in order to generate the actuation area, wherein the actuation area particularly is visible to the user.

7. The assembly module according to claim 1, wherein
the sensor system is configured such that the detection area is divided into at least two zones, namely into a near zone and a far zone, wherein the near zone is spaced apart from the sensor system by a shorter distance than the far zone, and wherein the detection of the user in accordance with step b) is not carried out until the user is located in the near zone.

8. The assembly module according to claim 1, wherein
at least the light module or the sensor comprises a lens system, wherein the lens system comprises at least a filter or the sensor system comprises a fixed lens system.

9. The assembly module according to claim 1, wherein
the assembly module is arranged in a receptacle designed for installing at least the assembly module on the motor vehicle or the assembly module or the receptacle is suitable for being mounted on the vehicle tail or on a side of the vehicle, particularly such that the assembly module can be integrated into a handle strip of the motor vehicle.

10. The assembly module according to claim 1, wherein
the optical sensor is a lateral drift field photodetector (LDPD) sensor.

11. The assembly module according to claim 1, wherein
the optical sensor system is configured such that the detection area is at least partially located above a ground area, on which the motor vehicle is parked.

12. The assembly module according to claim 1, wherein
the operating signal is at least a signal for unlocking, locking, opening or closing a movable part of the motor vehicle, wherein the movable part particularly is a tailgate or a side door or sliding door.

13. The assembly module according to claim 1, wherein
the light module, as well as the display element, is aligned in such a way that the actuation area is located closer to the motor vehicle than the detection area, particularly that two actuation areas are provided.

14. The assembly module according to claim 1, wherein the emergency actuation is only switched to an active state if the optical sensor system is inoperable.

15. A method for triggering an operating signal for a motor vehicle, particularly for operating an assembly module comprising an optical sensor system that carries out the following steps:
a) monitoring a detection area located outside the vehicle,
b) triggering a signal for starting an authentication check between an ID transmitter and the motor vehicle if a user is detected in the detection area,
c) monitoring an actuation area that is located outside the vehicle and differs from the detection area,
d) triggering an operating signal for the motor vehicle in case a user is detected in the actuation area,
wherein the assembly module further comprises an emergency actuation for carrying out the following step:
e) triggering the operating signal for the motor vehicle upon activation of the emergency actuation with a body part of the user,
wherein the assembly module comprises the emergency actuation, and the emergency actuation comprises an activator, so that the user is able to activate the emergency actuation in order to make available the operating signal for the vehicle by actuating the activator, which is accessible to the user, and
wherein one optical sensor and the activator is integrated in the assembly module, the optical sensor monitors the detection area and monitors the actuation area, and the optical sensor system optically monitors the detection area and the actuation area which have different spatial dimensions.

16. The method according to claim 15, wherein
the emergency actuation is activated in at least a capacitive, inductive or contactless fashion.

17. The method according to claim 15, wherein
step e) is carried out when the optical sensor system is at least defective or dirty.

18. The method according to claim 15, wherein
the emergency actuation is only enabled when a defective and/or dirty optical sensor system is detected.

19. The method according to claim 15, wherein
an authentication check between the ID transmitter and the motor vehicle is carried out after an activation of the emergency actuation in accordance with step e), wherein the operating signal for the motor vehicle is only made available in case of a positive authentication check.

20. The method according to claim 15, wherein
the sensor system is operated with increased power, particularly for monitoring at least the detection area, the actuation area, for generating the detection area or the actuation area, if it is detected that the optical sensor system is dirty.

21. The method according to claim 15, wherein
the detection area is divided into at least two zones, namely into a near zone and a far zone, wherein the near zone is spaced apart from the sensor system by a shorter distance than the far zone, wherein a detection of the user in accordance with step b) does not take place until the user is located in the near zone, and wherein the detection area particularly is permanently monitored.

22. The method according to claim 15, wherein
the sensor system emits light in the invisible range to the user, wherein the sensor system particularly emits pulsed light.

23. The method according to claim 15, wherein
a display element is provided and emits light in the visible range for step c) in order to generate an actuation area for the user.

24. The method according to claim 15, wherein
the sensor system comprises a sensor that receives light at least from the detection area or the actuation area, wherein the sensor system comprises a control unit that evaluates data of the sensor.

25. The method according to claim 15, wherein
the sensor system carries out a check for a distance change in order to detect the user who approaches the motor vehicle at least in the detection area or in the actuation area, wherein the sensor system particularly does not carry out a check for a distance change until the user is located in the near zone.

26. The method according to claim 15, wherein
the sensor system can be switched between a sleep mode and an operating mode, wherein the sensor system remains in the sleep mode until the user enters the near zone.

27. The method according to claim 15, wherein
the sensor system at least receives, records images of the detection area, or the actuation area, wherein the images consist of pulsed images and a non-pulsed images, wherein the pulsed images are produced by the reflection of pulsed light emitted by the sensor system and the non-pulsed images are produced by the light of at least the detection area or the actuation area, and wherein the pulse frequency of the emitted light particularly is lower in the sleep mode than in the operating mode.

28. The method according to claim 15, wherein
the check of the detection area is carried out in such a way that the pulsed images are compared with the non-pulsed images, wherein a check for a distance change particularly is carried out by comparing the pulsed images with the non-pulsed images.

29. The method according to claim 15, wherein
the ID transmitter transmits an authentication code to the access control system of the motor vehicle during at least step b) or e), and in that the access control system compares the authentication code with a stored code and an unlocking signal is triggered if the codes correspond.

30. The method according to claim 15, wherein
step d) is only carried out if a defined movement of a body part of the user takes place in/on the actuation area, wherein the body part particularly is a foot or a hand of the user.

31. The method according to claim 15, wherein
the actuation area is located on the ground, on which the user has to place a foot for step d), wherein the user particularly has to place a foot on the ground for a defined period of time only in order to trigger an operating signal in accordance with step d).

32. The method according to claim 15, wherein
the sensor system features a light-emitting light module such that an emission area is generated, wherein the sensor has a reception area that at least partially coincides with the emission area, and wherein the coinciding area forms the detection area.

33. The method according to claim 15, wherein the activator comprises a push-button or a switch.

34. An assembly module for a motor vehicle comprising:
an optical sensor system configured for
a) monitoring a detection area located outside the vehicle,
b) triggering a signal for starting an authentication check between an ID transmitter and the motor vehicle if a user is detected in the detection area,
c) monitoring an actuation area that is located outside the vehicle and differs from the detection area,
d) triggering an operating signal for the vehicle in case a user is detected in the actuation area; and
an emergency actuation for additionally triggering the operating signal and configured for
e) triggering the operating signal for the vehicle upon activation of the emergency actuation with a body part of the user,
wherein the assembly module comprises the emergency actuation, and the emergency actuation comprises an activator, so that the user is able to activate the emergency actuation in order to make available the operating signal for the vehicle by actuating the activator, which is accessible to the user,
wherein one optical sensor and the activator is integrated in the assembly module, the optical sensor monitors the detection area and monitors the actuation area, and the optical sensor system optically monitors the detection area and the actuation area which have different spatial dimensions,
wherein, after activation of the emergency actuation, the authentication check is carried out between the ID transmitter and the motor vehicle, and the operating signal for the motor vehicle is not provided until a positive authentication check is carried out.

35. An assembly module for a motor vehicle comprising:
an optical sensor system configured for
a) monitoring a detection area located outside the vehicle,
b) triggering a signal for starting an authentication check between an ID transmitter and the motor vehicle if a user is detected in the detection area,
c) monitoring an actuation area that is located outside the vehicle and differs from the detection area,
d) triggering an operating signal for the vehicle in case a user is detected in the actuation area; and
an emergency actuation for additionally triggering the operating signal and configured for
e) triggering the operating signal for the vehicle upon activation of the emergency actuation with a body part of the user,
wherein the assembly module comprises the emergency actuation, and the emergency actuation comprises an activator, so that the user is able to activate the emergency actuation in order to make available the operating signal for the vehicle by actuating the activator, which is accessible to the user, wherein the optical sensor system comprises an optical sensor and a light module, wherein the light module can emit light, such that the detection area is generated, and the optical sensor is configured for receiving light from at least the detection area or the actuation area, and wherein the detection area is invisible to the user, and wherein the optical sensor and the activator is integrated in the assembly module, the optical sensor monitors the detection area and monitors the actuation area, and the optical sensor system optically monitors the detection area and the actuation area which have different spatial dimensions.

\* \* \* \* \*